(12) United States Patent
Richardson

(10) Patent No.: US 7,249,598 B1
(45) Date of Patent: Jul. 31, 2007

(54) HYDROGEN AUGMENTED DIESEL CRANKCASE VENTILATION

(76) Inventor: James M. Richardson, 26136 Falboa Ct. P.O. Box 1242, Helendale, CA (US) 92142

( * ) Notice: Subject to any disclaimer, the term of this patent is extended or adjusted under 35 U.S.C. 154(b) by 81 days.

(21) Appl. No.: 11/330,466

(22) Filed: Jan. 12, 2006

(51) Int. Cl.
F02B 43/08 (2006.01)
F02M 26/06 (2006.01)

(52) U.S. Cl. .............. 123/572; 123/3; 123/DIG. 12
(58) Field of Classification Search ........ 123/572–574, 123/3, DIG. 12
See application file for complete search history.

(56) References Cited

U.S. PATENT DOCUMENTS

| | | | |
|---|---|---|---|
| 3,101,592 A * | 8/1963 | Robertson et al. ....... 60/39.463 |
| 3,844,262 A * | 10/1974 | Dieges ................ 123/567 |
| 4,068,628 A * | 1/1978 | Duckworth ............. 123/58.8 |
| 4,111,160 A | 9/1978 | Talenti |
| 4,573,435 A | 3/1986 | Shelton |
| 5,272,871 A | 12/1993 | Oshima et al. |
| 5,343,699 A | 9/1994 | McAlister |
| 5,927,075 A | 7/1999 | Khair |
| 6,155,212 A | 12/2000 | McAlister |
| 6,332,434 B1 * | 12/2001 | De Souza et al. ........... 123/3 |
| 6,606,982 B1 * | 8/2003 | Stockhausen et al. ..... 123/572 |
| 6,901,889 B1 | 6/2005 | Ritter et al. |
| 6,915,869 B2 | 7/2005 | Botti et al. |
| 2005/0258049 A1 | 11/2005 | Klein |

* cited by examiner

Primary Examiner—Marguerite McMahon
(74) Attorney, Agent, or Firm—Kenneth L. Green; Edgar W. Averill, Jr.

(57) ABSTRACT

A hydrogen augmented diesel crankcase ventilation system uses hydrogen to allow crankcase fumes, for example blow-by, to be burned by the engine. The system preferably includes a hydrogen generation system as a hydrogen source connected to an engine air intake by a first hose, a second hose connecting the crankcase to the air intake, and a third hose connecting a fresh air source to the crankcase. An orifice or a vacuum regulator in cooperation with the second hose may be included to regulate crankcase vacuum. A filter may reside inline with the second hose to capture solids or liquids which enter the second hose from the crankcase. A back flow preventor may be included in cooperation with the third hose to prevent a back flow of crankcase fumes through the third hose.

20 Claims, 3 Drawing Sheets

HYDROGEN AUGMENTED DIESEL CRANKCASE VENTILATION

BACKGROUND OF THE INVENTION

The present invention relates to reducing emissions from diesel engines and in particular mixing hydrogen with crankcase fumes to facilitate combustion.

Diesel engines are commonly used in commercial applications such as trucks and stationary engines. These engines typically have much higher compression ratios than gasoline engines, and as a result, a substantial amount of diesel blow-by escapes past the piston rings. Unlike gasoline engines which use a simple crankcase ventilation, the diesel blow-by is generally vented to the outside, and presents a source of unpleasant fumes. The diesel engines typically can not simply vent the crankcase to the engine intake, because the diesel blow-by includes components which will degrade the diesel engine operation.

BRIEF SUMMARY OF THE INVENTION

The present invention addresses the above and other needs by providing a hydrogen augmented diesel crankcase ventilation system which uses hydrogen to allow crankcase fumes, for example blow-by and/or fumes resulting from the breakdown of engine oil, to be burned in the engine. The system preferably includes a hydrogen generation system as a hydrogen source connected to an engine air intake by a first hose, a second hose connecting the crankcase to the air intake, and a third hose connecting a fresh air source to the crankcase. An orifice or a vacuum regulator in cooperation with the second hose may be included to regulate crankcase vacuum. A filter may reside inline with the second hose to capture solids or liquids which enter the second hose from the crankcase. A back flow preventor may be included in cooperation with the third hose to prevent back flow of crankcase fumes through the third hose.

In accordance with one aspect of the invention, there is provided a hydrogen augmented diesel crankcase ventilation system. The system includes a hydrogen generator, a first hose connecting the hydrogen generator to an engine air intake, a second hose connecting an engine crankcase to the engine air intake, and a third hose connecting a fresh air source to the engine crankcase. The engine air intake preferably resides between an air cleaner and a supercharger, and more preferably a turbo charger. The first hose carries hydrogen gas and oxygen gas generated in the hydrogen generator to the air intake. A regulator or an orifice cooperates with the second hose to regulate a flow through the second hose and/or to regulate crankcase vacuum. A back flow preventor cooperating with the third hose to prevent a back flow of crankcase fumes through the third hose.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
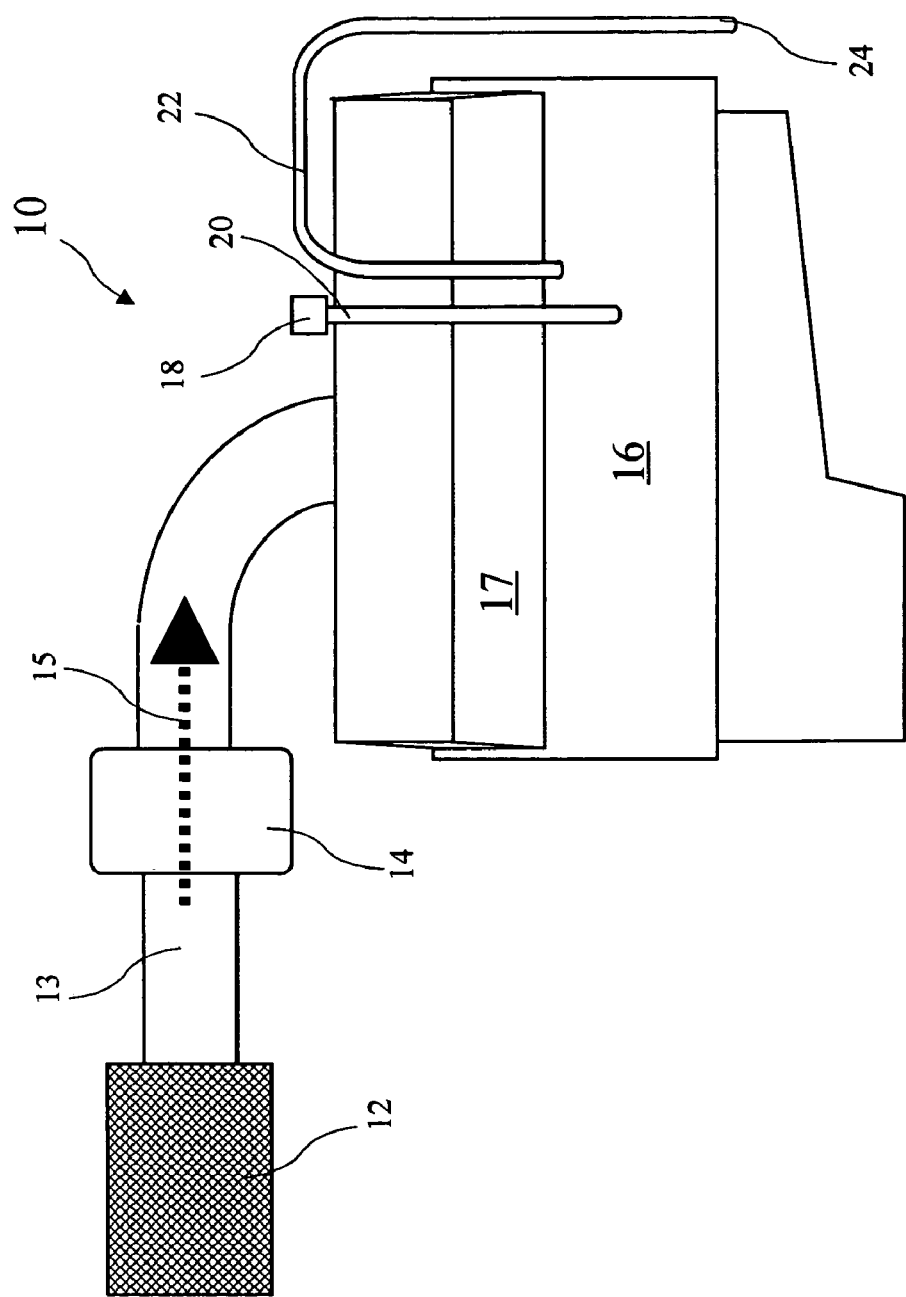
FIG. 1 is a prior art diesel engine.

A typical known diesel cycle engine 10 is shown in FIG. 1. Diesel cycle engines generally use common diesel fuel, but may use other fuels, for example, bio diesel fuel, or the like. The diesel engine 10 includes an engine block 16 which encloses a crankcase. One or two cylinder heads 17 are attached to the block 16 and generally contain valves and intake and exhaust ports. An airflow 15 used in the combustion process enters the diesel cycle engine 10 through an air cleaner 10, passing through an air intake 13 and a super charger 14, which super charger 14 is preferably a turbo charger. The diesel cycle engine 10 further includes an oil fill cap 18 on an oil fill tube 20 for adding motor oil to the diesel cycle engine 10. The diesel cycle engine 10 also includes a crankcase breather 22 with an open end 24 for venting the crankcase and allowing diesel blow-by and the like to escape the crankcase.

Figure 2:
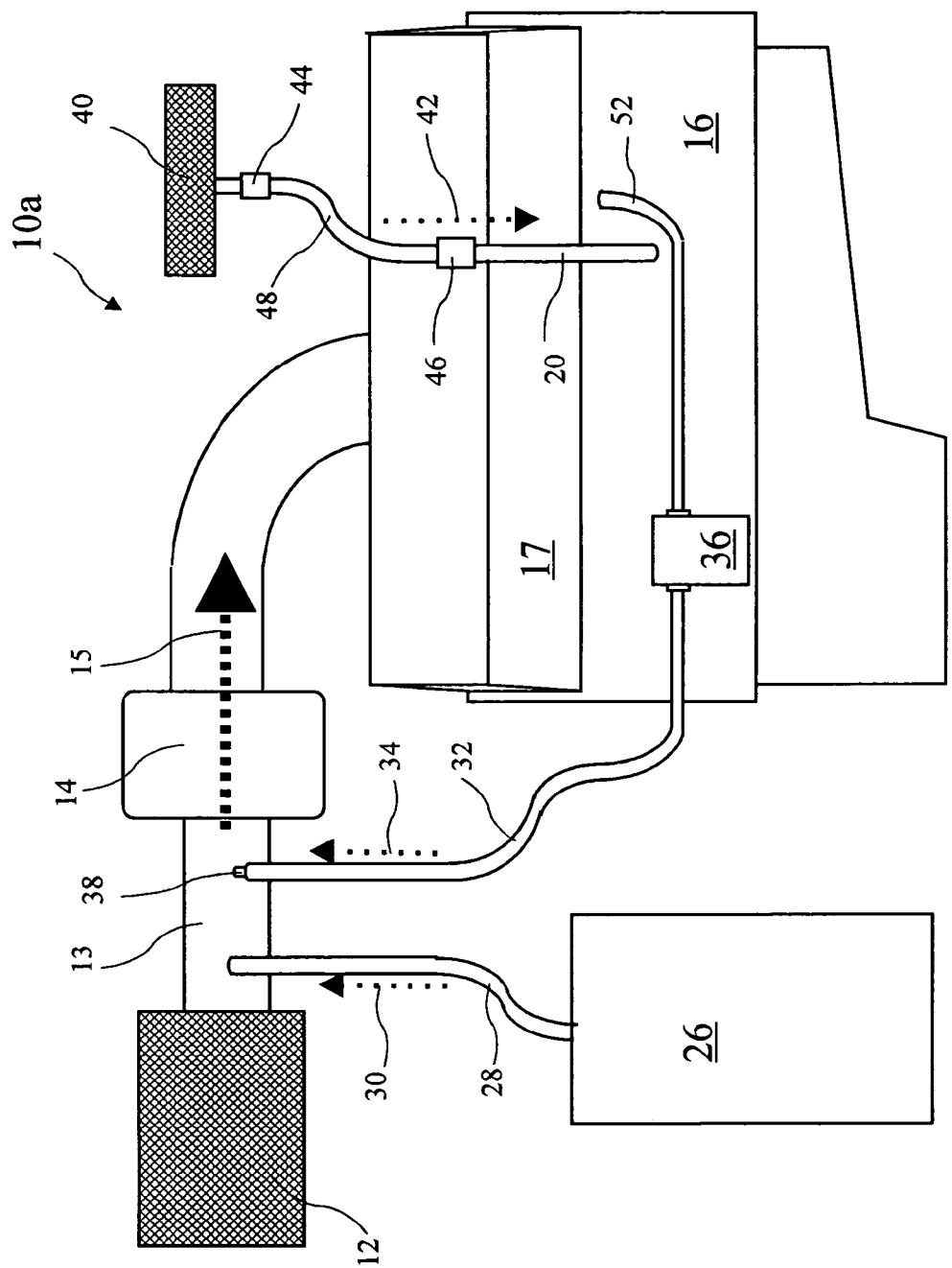
FIG. 2 is an improved diesel engine including a hydrogen augmented diesel crankcase ventilation system according to the present invention.

An improved diesel cycle engine 10b with a hydrogen augmented diesel crankcase ventilation system is shown in FIG. 2. The diesel cycle engine 10a includes a hydrogen source 26 which is preferably a hydrogen generator. Examples of suitable hydrogen generators are well known and described in US Patent Application Publication No. 2005/0258049 for "Hydrogen Generator For Use in a Vehicle Fuel System," U.S. Pat. No. 4,573,435 for "Method and Apparatus for Generating Hydrogen Gas for Use As a Fuel Additive on a Diesel Engine," U.S. Pat. No. 6,155,212 for "Method and Apparatus for Operation of Combustion Engines," and U.S. Pat. No. 6,901,889 for "Fumigation System for a Diesel Engine". The '049 application and the '435, '212, and '889 patents are herein incorporated by reference.

The hydrogen source 26 is connected to the air intake 13 by a first hose 28. A first flow 30 including hydrogen gas is carried by the first hose 28 from the hydrogen source 26 to the air intake 13. Preferably, the first flow 30 includes both hydrogen gas and oxygen gas produced by a hydrogen generator from water. The breather 22 (see FIG. 1) is replaced by a breather hose 52, filter 36, and second hose 32 connecting the block 16 to the air intake 13. The air intake 13 may provide the air flow 15 to the diesel cycle engine through a supercharger 14, or directly to the diesel cycle engine. A supercharge generally provides greater vacuum in the second hose 32, but in many cases, the intake manifold vacuum in a normally aspirated (i.e., non-supercharged) engine is sufficient. The hoses 52, 32 carry a second flow 34 comprising blow-by and other crankcase fumes (e.g., fumes generated by the breakdown of engine oil) and material which previously were vented to the atmosphere through the breather 22. The hose 28 and hose 32 are preferably connected to the air intake 32 at spaced apart points.

A restriction 38 restricts the second flow 34, which restriction 38 preferably cooperates with the hose 32 or the hose 52, and more preferably resides proximal to the connection point of the hose 32 to the air intake 13. The restriction 38 regulates (or limits) the flow 34 into the air intake 13. The restriction 38 may be manually adjustable or may be self adjusting, for example, like a pressure or vacuum regulator, or may, for example, be a fixed size replaceable orifice, a variable orifice, or a clamp to squeeze the outside of the hose 32 or the hose 52 to restrict the second flow 34. The restriction 38 may be used to adjust crankcase vacuum and preferably results in between approximately one pound and approximately four pounds of crankcase vacuum, and more preferably results in approximately two pounds of crankcase vacuum. In general, a larger engine will operate with a higher crankcase vacuum, and a small engine will operate with a lower crankcase vacuum. The restriction 38 may further cooperate with a vacuum regulator in the fresh air hose 48 to regulate crankcase vacuum.

The fourth hose 52 and a filter 36 preferably connect between the crankcase 16 and the hose 32. The hose 52 preferably connects to the block 16 where the breather 22 (see FIG. 1) would otherwise connect and the filter 36 catches any solids or liquids which enter the hose 52. The filter 36 may further include a clear body to allow observation of any solids or liquids collected by the filter 36, and may further include a back flow preventor.

A second air filter 40 is connected to the oil fill tube 20 by a third (or fresh air) hose 48 and a coupling 46. The air filter 40 allows a third flow 42 of fresh air to enter the crankcase to support a flow through the crank case and into the hose 32, and/or to help cool the crankcase. A back flow preventor 44 may reside inline in the hose 48 to prevent blow-by or other fumes, liquids, or solids from escaping the diesel cycle engine 10a through the air filter 40. The back flow preventor 44 may further include a vacuum regulator to regulate the crankcase vacuum. The crankcase vacuum is preferably regulated to be between approximately one and approximately four pounds.

While hoses 28, 32, 48, and 52 are referenced above, metal or plastic tubing may be used as well, or any suitable conduit, may be used to carry the flows 30, 34, and 42. Also, the hose 52 and the hose 48 may connect with the crankcase at any suitable point using any suitable connection, and are not limited to connecting through existing connection points.

Figure 3:
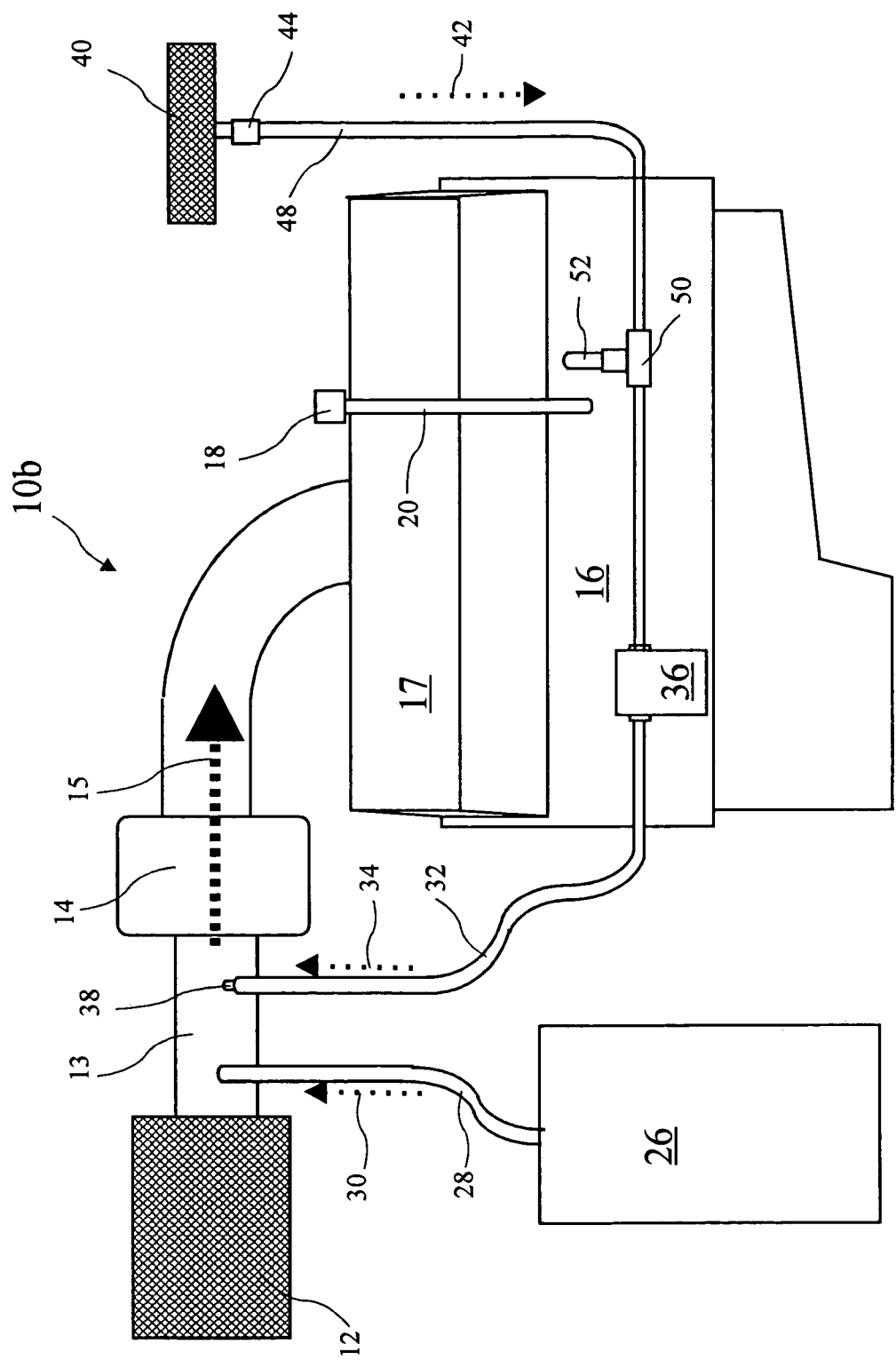
FIG. 3 is a second embodiment of an improved diesel engine including a hydrogen augmented diesel crankcase ventilation system according to the present invention.

A second embodiment of an improved diesel engine 10b including a hydrogen augmented diesel crankcase ventilation system according to the present invention is shown in FIG. 3. The improved diesel engine 10b includes a "T" 50 connecting the fresh air hose 48 to the breather hose 52. The improved diesel engine 10b is otherwise similar to the improved diesel engine 10a.

While the invention herein disclosed has been described by means of specific embodiments and applications thereof, numerous modifications and variations could be made thereto by those skilled in the art without departing from the scope of the invention set forth in the claims.

I claim:

1. A hydrogen augmented crankcase ventilation system comprising:
    a diesel engine including:
        an engine air intake;
        an engine crankcase; and
        the hydrogen augmented crankcase ventilation system comprising:
            a hydrogen source;
            a first hose connecting the hydrogen source to the engine air intake, the first hose carrying a first flow including hydrogen from the hydrogen source to the engine air intake;
            a second hose connecting the engine crankcase to the engine air intake, the second hose carrying a second flow from the engine crankcase to the engine air intake, such that the first and second flows are combined together and joined with air received by the diesel engine through the engine air intake; and
            a third hose in fluid communication with the engine crankcase, the third hose carrying a third flow of fresh air.

2. The system of claim 1, wherein the hydrogen source is a hydrogen generator and the first hose carries hydrogen gas to the air intake.

3. The system of claim 2, wherein the first hose carries both hydrogen gas and oxygen gas to the air intake.

4. The system of claim 1, wherein the engine air intake resides between an air cleaner and a super charger.

5. The system of claim 4, wherein the engine air intake resides between an air cleaner and a turbo charger.

6. The system of claim 1, wherein the third hose is connected between a second air cleaner and the crankcase.

7. The system of claim 6, wherein the second air filter includes an in-line back flow preventor.

8. The system of claim 6, wherein the third hose includes an in-line back flow preventor.

9. The system of claim 1, wherein the third hose connects to the crankcase through an oil fill tube.

10. The system of claim 1, wherein the second hose includes an inline filter for collecting liquids which enter the second hose.

11. The system of claim 1, wherein the in-line filter includes a clear portion for viewing liquids collected by the in-line filter.

12. The system of claim 1, wherein the second flow is restricted to limit the amount of flow.

13. The system of claim 12, wherein the second flow is restricted to result in a crankcase vacuum between approximately one pound and approximately four pounds.

14. The system of claim 1, further including an orifice for regulating the second flow through the second hose from the crankcase to the air intake.

15. The system of claim 14, wherein the orifice resides proximal to where the second hose connects to the air intake.

16. The system of claim 1, wherein the first hose and the second hose connect to the engine air intake at spaced apart points.

17. The system of claim 1, wherein the third hose includes a vacuum regulator.

18. A diesel cycle engine including a hydrogen augmented crankcase ventilation system, the engine comprising:
    a diesel cycle engine including:
        an engine air intake residing between an air cleaner and a super charger; and
        an engine crankcase containing at least one of a set of crankcase fumes consisting of blow-by and fumes resulting from the breakdown of engine oil;
    a hydrogen generator which generates hydrogen gas and oxygen gas;
    a first hose connecting the hydrogen generator to the engine air intake which first hose carries a first flow from the hydrogen generator to the engine air intake;
    a second hose connecting the engine crankcase to the engine air intake, which second hose carries a second flow of crankcase fumes from the crankcase to the engine air intake, such that the first and second flows are combined together and joined with air received by the diesel cycle engine through the engine air intake;

a third hose connecting a second air cleaner to the engine crankcase to provide a third flow of fresh air to the crankcase; and a restriction cooperating with the second flow.

19. The system of claim 18, wherein the third hose includes a vacuum regulator.

20. A hydrogen augmented diesel cycle engine crankcase ventilation system comprising:

a diesel engine including an engine air intake residing between an air cleaner and a super charger;

a hydrogen generator;

a first hose connecting the hydrogen generator to the engine air intake, which first hose carries hydrogen gas and oxygen gas generated in the hydrogen generator to the engine air intake;

a second hose connecting an engine crankcase to the engine air intake to carry a second flow of crankcase fumes from the engine crankcase to the engine air intake; such that the first and second flows are combined together and joined with air received by the diesel engine through the engine air intake;

a restriction cooperating with the second flow to restrict the second flow;

a third hose connecting a fresh air source to the engine crankcase to carry fresh air to the engine crankcase; and a back flow preventor cooperating with the third hose to prevent a back flow through the third hose.

* * * * *